United States Patent [19]
Owens et al.

[11] Patent Number: 5,439,363
[45] Date of Patent: Aug. 8, 1995

[54] MAGNETIC SUPPORT SYSTEM FOR CABLE INSERTION TUBE

[75] Inventors: Steve C. Owens, Coweta County; Richard V. Lovvorn, Carroll; Albert B. Elder, Haralson, all of Ga.

[73] Assignee: Southwire Company, Carrollton, Calif.

[21] Appl. No.: 232,883

[22] Filed: Apr. 25, 1994

[51] Int. Cl.⁶ .................................. B29C 47/90
[52] U.S. Cl. ............................. 425/3; 425/67; 425/71; 425/113; 425/461; 264/978 R; 264/209.4
[58] Field of Search ............... 425/3, 67, 68, 69, 70, 425/71, 113, 461; 264/178 R, 209.4

[56] References Cited

U.S. PATENT DOCUMENTS

| | | | |
|---|---|---|---|
| 2,945,258 | 7/1960 | Houston | 425/71 |
| 3,211,818 | 10/1965 | Beckwith | 264/174 |
| 3,296,344 | 1/1967 | Timmerman | 264/95 |
| 3,530,536 | 9/1970 | Thorman | 18/14 |
| 3,538,210 | 11/1970 | Gatto | 264/90 |
| 3,893,465 | 7/1975 | Cheatwood | 134/122 |
| 4,086,044 | 4/1978 | Sikora | 425/113 |
| 4,137,025 | 1/1979 | Graves | 425/71 |
| 4,508,500 | 4/1985 | French | 425/388 |
| 4,575,326 | 3/1986 | French | 425/71 |
| 5,139,402 | 8/1992 | Topf | 425/71 |
| 5,271,786 | 12/1993 | Gorney et al. | 425/71 |

FOREIGN PATENT DOCUMENTS

| | | | |
|---|---|---|---|
| 1581554 | 10/1976 | United Kingdom . | |
| 1077803 | 3/1984 | U.S.S.R. | 425/3 |

*Primary Examiner*—Khanh P. Nguyen
*Attorney, Agent, or Firm*—Stanley L. Tate; James W. Wallis, Jr.

[57] ABSTRACT

A ferromagnetic cable insertion tube is cantilevered from a polymeric conduit extruder and separates an electrical and/or optical cable being pulled through the conduit from the inner surface of the conduit until it has solidified. A d.c. current source is applied to a coil surrounding the cable insertion tube upstream of the extruder so as to induce a magnetic flux in the tube and create a north pole at the downstream free end of the tube and a south pole at the upstream free end of the tube. An array of magnets is assembled about the insertion tube at the downstream free end or north pole thereof. The magnets are arranged with their north poles confronting the north pole of the insertion tube so that the repulsive forces between the like poles magnetically levitate the free end of the insertion tube and keep it from sagging into contact with the extruded conduit.

12 Claims, 3 Drawing Sheets

MAGNETIC SUPPORT SYSTEM FOR CABLE INSERTION TUBE

FIELD OF THE INVENTION

The present invention relates to the extrusion of polymeric conduit around cables, such as electrical and optical cables, and more particularly, to an apparatus for supporting the downstream free end of a cable insertion tube extending inside the conduit during extrusion thereof.

BACKGROUND OF THE INVENTION

Electrical and optical cables, and especially continuously formed electrical and optical cables, are often encased in a seamless polymeric ("plastic") sheath or conduit of indeterminate length which provides a durable enclosure especially useful in subterranean applications. The resulting assembly is fabricated by pulling the cables through an extruder apparatus in which a plastic conduit is extruded about the longitudinal extent of the cables, the outer diameter of the plastic conduit then being sized by calibrator sizing rings positioned immediately downstream of the extruder head, followed by cooling and solidification of the conduit by passage of the assembly through serially-connected water cooling tanks.

Depending on the rate of extrusion and the rate of cooling of the conduit, the cables can contact the still-tacky inner surface of the plastic conduit resulting in the cables sticking to the inner surface as they travel with the extruded conduit. It is sometimes desirable to remove and replace the cables inside the conduit without replacing the conduit, especially in the case of underground installations. Accordingly, removal of the cables by pulling them from the plastic conduit would be prevented if the cables were adhered to the inner surface of the conduit.

Various approaches have been taken to overcome this problem. U.S. Pat. No. 3,211,818 discloses an extruder apparatus for making a conduit and cable assembly. The apparatus has a rigid tubular mandrel cantilevered from the extruder in the downstream direction of the extruded plastic conduit. The cantilevered tube supports the cables to be encased by the conduit and extends into a coolant sprayhead area a distance which is sufficient to allow for substantial solidification of the plastic conduit before the inner surface thereof is contacted by the cables. However, when the extrusion rate is increased, the cantilevered tube must be lengthened commensurately since solidification of the conduit and elimination of the tackiness of the inner surface of the conduit takes place farther downstream. When the cantilevered tube is lengthened, it begins to sag under its own weight causing the free end thereof to bear against the inner inner of the unsolidified conduit and resulting in gouging of the conduit wall of the conduit.

Another approach is disclosed in U.S. Pat. No. 4,508,500 in which a cable conduit extrusion apparatus includes a flexible corrugated metal tube extending from the extruder outlet into the extruded conduit as it travels through a differential pressure calibrating and cooling tank. The flexible tube has an outside diameter substantially the same as the inside diameter of the extruded conduit and is thereby supported along a substantial portion of the conduit on the peaks of the corrugations of the flexible tube. The flexible tube is primarily intended to accommodate up and down movement of the conduit resulting from buoyant forces acting on the conduit during its travel through the cooling tank. This apparatus still results in undesirable contact between the corrugated tube and unsolidified portions of the extruded conduit.

It would be desirable therefore to provide an apparatus for extruding a conduit containing one or more cables in which the cables and all other parts of the apparatus are kept separated from the inner wall of the conduit until the conduit is completely solidified regardless of the extrusion speed of the apparatus.

SUMMARY OF THE INVENTION

It is an object of the present invention to control sagging of a cantilevered cable insertion tube during extrusion and fabrication of an assembly of a plastic conduit and an electrical or optical cable by providing apparatus which maintains substantially concentric spacing and separation between the cable insertion tube and the unsolidified extruded plastic conduit regardless of the rate of extrusion.

It is another object of the present invention to provide apparatus for extruding a plastic conduit about electrical and/or optical cables at high operating speeds.

The present invention provides apparatus for preventing sagging of a cantilevered cable insertion tube which carries electrical and/or optical cables as they are being encased in an extruded plastic conduit of indeterminate length. The insertion tube is formed of a cylindrical ferromagnetic pipe cantilevered from the extruder apparatus. A d.c. current source is applied to a coil surrounding the free end of the insertion tube upstream of the extruder so as to induce a magnetic field in the tube similar to that of a bar magnet. When the d.c. current source is energized, the tube is magnetized with its downstream end defining a north (or south) pole and its upstream end defining a south (or north) pole.

An annular array of permanent magnets or electromagnets is assembled about the downstream free end of the cantilevered insertion tube. The magnets are arranged to surround the extruded conduit and the downstream free end (north pole) of the insertion tube. The magnets are arranged with their north poles confronting the north pole of the insertion tube. The repulsive forces between the like poles of the magnets and the tube will magnetically levitate the free end of the insertion tube to keep it from sagging and will maintain it in a substantially concentric relationship with the extruded conduit. An additional annular array of magnets may be positioned about the conduit and insertion tube near the free downstream end of the insertion tube to generate another magnetic field which reinforces the desired concentric spacing between the tube and the extruded conduit.

The magnets are preferably sized, spaced and/or electrically controlled to take into account the gravitational forces acting on the insertion tube or to magnetically position or reposition the cable insertion tube to any desired spatial position inside the conduit. Advantageously, the cable insertion tube may be magnetically positioned and repositioned by computer-controlled electromagnets to accommodate heavier cable passing through the tube and to maintain the necessary spacing between the unsolidified inner surface of the plastic conduit and the insertion tube.

DETAILED DESCRIPTION OF THE INVENTION

Figure 1:
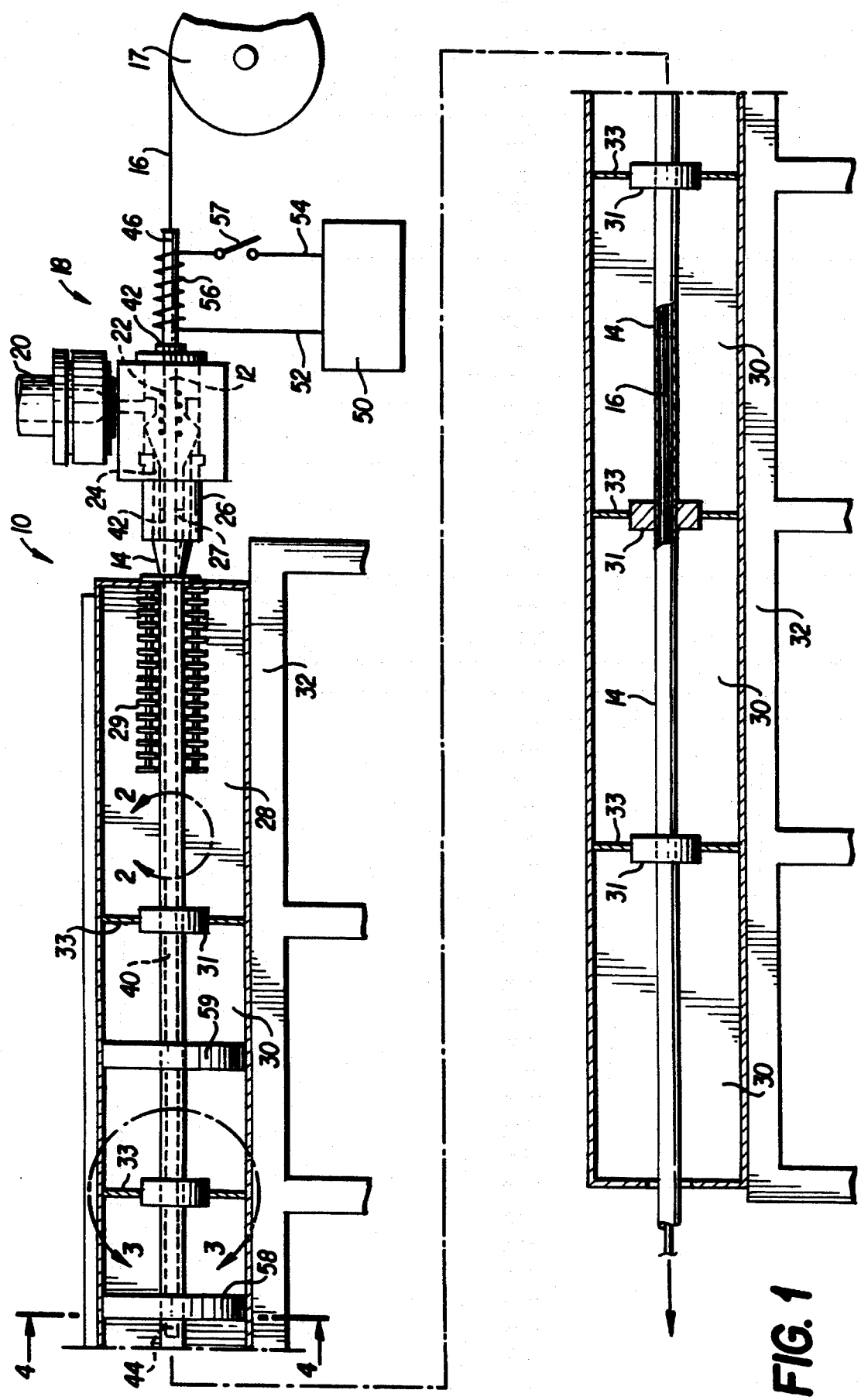
FIG. 1 is a side elevational view, partly in cross-section, of the magnetic support system of the present invention used in connection with a conventional plastic conduit extrusion apparatus.

Referring now in detail to the drawings wherein like parts are designated by like reference numerals throughout, there is illustrated in FIG. 1 a magnetic support system 10 for supporting a cable insertion tube 12 during extrusion of a polymeric ("plastic") conduit 14 about electrical wires or optical fibers 16 or the like, hereinafter collectively termed "cables." The cables 16 are supplied from one or more pay-off reels 17 to a polymer-melt extruder 18. The extruder 18 includes an inlet 20 for receiving a polymer-melt supply, such as a polyethylene resin, a heater 22 for maintaining the polymer-melt supply in a semi-liquid state, and an annular flow passageway 24 for forming the flow of the liquefied polymer-melt within the extruder 18 around the cables 16. The extruder 18 also includes an extrusion outlet 26 having an annular die orifice 27 through which the plastic is extruded to form conduit 14. Conduit 14 in a semisolidified state is directed to a differential pressure calibrating tank 28 filled with cooling water and having a plurality of calibrating rings 29 for sizing the outside diameter of the conduit. The sized plastic conduit 14 is then passed through a plurality of cooling water vacuum tanks 30 arranged in end-to-end relation with the differential pressure calibrating tank 28 on a raised support frame 32 in a manner similar to that shown in U.S. Pat. No. 3,538,210, the disclosure of which is incorporated herein by reference.

A cable insertion tube 40 made of a ferromagnetic material, such as steel, is rigidly mounted to the extruder 18 in a cantilevered fashion. The tube 40 extends through the extruder 18 inside of and concentric to the annular passageway 24 and die orifice 27 that forms the extruded conduit 14. The tube 40 is preferably heat insulated from the metal parts of the extruder 18 by bushings 42 to minimize conductive heat transfer to the tube 40 from the extruder 18. The cable insertion tube 40 includes a first free end 44 (FIGS. 1 and 5) extending downstream of the extruder 18 to a point where the inner surface of conduit 14 is solidified and substantially non-tacky regardless of the extrusion rate of the conduit. A second free end 46 of the tube 40 extends from the extruder 18 in an upstream direction and cable 16 is fed into the tube from the pay-off reel(s) 17.

Figure 2:
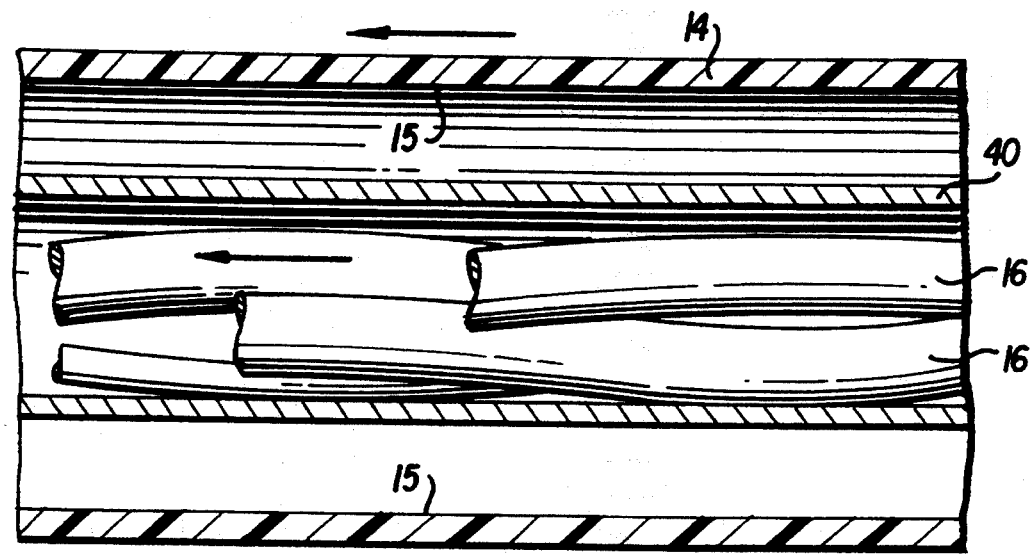
FIG. 2 is a vertical cross-sectional view, taken at detail 2—2 in FIG. 1, showing an assembly of electrical and/or optical cables being supported by the cable insertion tube of the present invention magnetically held in concentric relationship within the extruded plastic conduit at an intermediate position of the cable insertion tube.
Figure 3:
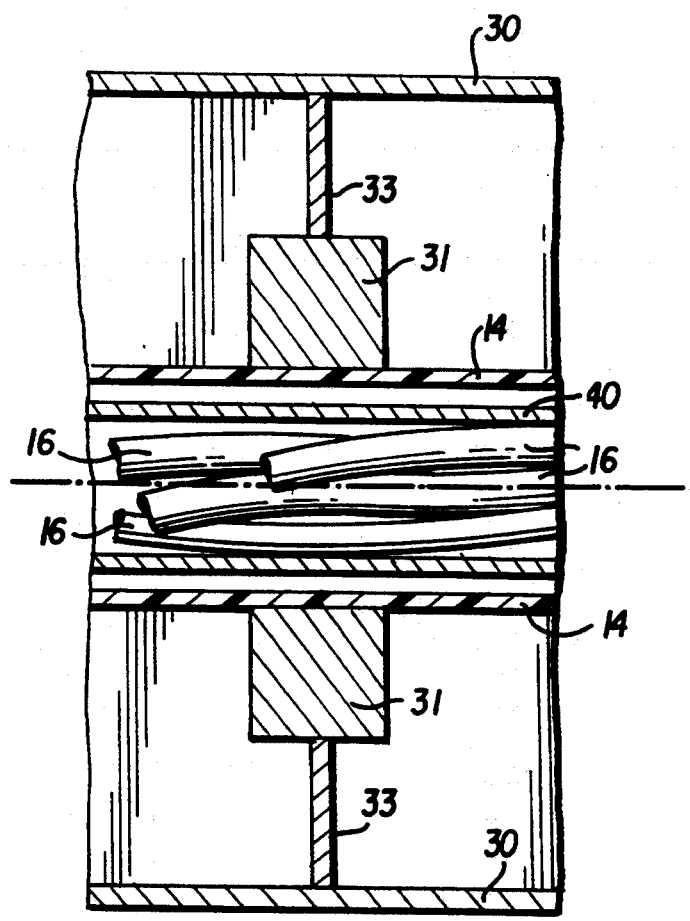
FIG. 3 is a vertical cross-sectional view, taken at detail 3—3 in FIG. 1, showing a hard support located at an intermediate length of the cable insertion tube for constraining the extruded conduit to a predetermined path through the coolant tanks.

With reference to the FIG. 2 detail, the cable insertion tube 40 is substantially cylindrical in cross-section and supports the cables 16 spaced radially inwardly away from the inner surface 15 of the conduit 14. It will be appreciated that the tube 40 remains stationary and the conduit 14 and cables 16 travel in the direction of the arrows at substantially the same speed, namely, the rate of extrusion from extruder 18. Now referring to FIG. 3, a hard support 31 constrains the extruded conduit 14 to a fixed longitudinal axis along the length of the cooling tanks 28, 30. At least one such support 31 is provided in each bulkhead 33 separating the water tanks 28, 30 from one another.

Referring again to FIG. 1, a d.c. current source 50 is electrically connected through leads 52, 54 to an electrical coil 56 circumferentially surrounding the second or upstream free end 46 of the cable insertion tube 40. When the circuit is closed by operation of a switch 57, electrical current provided by the current source 50 flows through the coil 56 so as to induce a magnetic flux in the cable insertion tube 40 and generate a magnetic field with a first polarity at the first free end 44 and a second, opposite polarity at the second free end 46 so that, e.g., the downstream end 44 is a north (or south) pole and the upstream end 46 is a south (or north) pole, depending on the direction of current flow in the coil 56.

Figure 4:
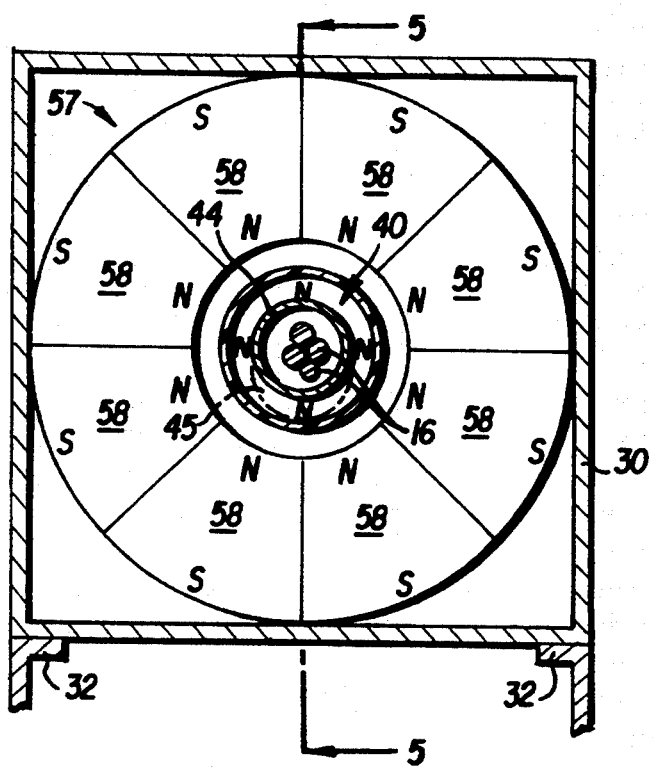
FIG. 4 is a transverse vertical cross-sectional view of the magnetic support system of the present invention, taken along line 4—4 of FIG. 1.
Figure 5:
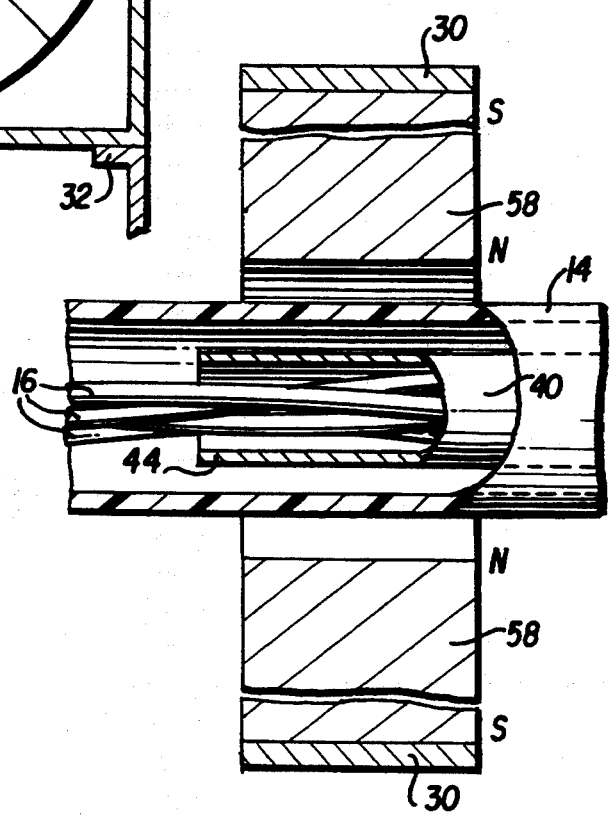
FIG. 5 is a vertical cross-sectional view of the magnetic support system of the present invention, taken along line 5—5 of FIG. 4, showing the free downstream end of the cable insertion tube being magnetically supported in concentric relationship with the plastic conduit.

Referring now to FIGS. 4 and 5, a plurality of magnets 58 are arranged in an annular structure 57 substantially concentrically to the extruded conduit 14 at the downstream or first end 44 of the insertion tube 40 such that the north pole of the magnets 58 confront the first end 44 or north pole 44 of the tube 40. The repulsive forces between the like poles will keep the first free end 44 of the insertion tube 40 from sagging under its own weight and the weight of cables 16 and will maintain it in a substantially concentric relationship with the extruded conduit 14. As will be appreciated by the skilled artisan, each annular magnetic structure may be a unitary structure or an array of individual magnets 58 as shown. Furthermore, it will be appreciated that the magnetic structure 57 will be either eccentrically positioned or magnetically biased to account for the gravitational forces acting on the tube 40.

It is contemplated that the magnet structure 57 could be an electromagnet having a d.c. current source for selective energization. It is further contemplated that the system of the present invention could be operated under computer control in combination with one or more electromagnets, whereby variation of the magnetic flux field of part or all of each magnet 58 is accomplished by altering the d.c. current supplied thereto, to enable incremental adjustment of the position of the free end 44 of the tube relative to the inner wall of the plastic conduit 14. Such control may be especially desirable where, for example, cables 16 of varying weights are carried in the tube 40.

An additional magnet, such as an electromagnet 59, having a magnet structure similar to magnet structure 57 may be positioned near the downstream end 44 of cable insertion tube 40, as shown in FIG. 1 to reinforce or selectively alter or adjust the desired concentricity of the tube within the conduit.

Figure 6:
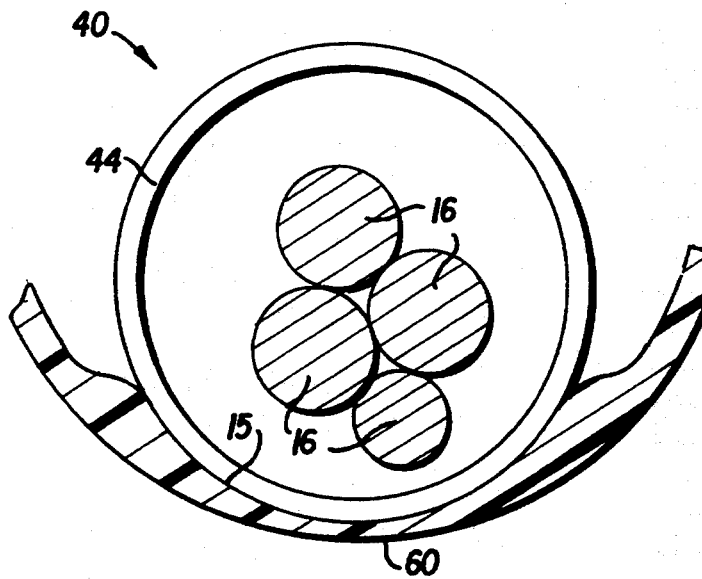
FIG. 6 is a cross-sectional view of an assembly of electrical and/or optical cables carried by a cable insertion tube, showing the position of the free end of the cable insertion tube if it were unsupported by the magnetic support system of the present invention.

According to the present invention and with reference to FIG. 4, when the power source 50 is energized, a magnetic flux is generated in the cable insertion in tube 40 to define a north pole N at the free end 44 of the tube 40. Repulsive magnetic forces generated by north poles N of the magnets 58 magnetically levitate or suspend the free end 44 of the cable insertion tube 40 in a substantially concentric relationship with the plastic conduit 14. Deenergizing the magnetic flux field in tube 40 by opening switch 57 results in sagging of the free end 44 under its own weight and the weight of cables 16 to a new position 45 shown in phantom lines in FIG. 4. With particular reference to FIG. 6, such deenergizing of the power source 50 would result in the free end 44 engaging the inner wall 15 of the conduit and gouging or thinning out the wall of conduit 14 at the lowermost portion 60 thereof. This is the position the free end 44 of tube 40 would take in the prior art devices in which the insertion tube was lengthened because of substantially increased extrusion rates of the conduit resulting in the existence of a tacky condition of the inner conduit wall farther downstreatm in the conduit. This prior art condition of FIG. 6 is eliminated by the present invention.

Although a preferred embodiment of the guide tube of the present invention has been specifically described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. Apparatus for positioning a cable in a bore of an extruded polymeric conduit, comprising:
   means for extruding the conduit;
   a ferromagnetic cable insertion tube cantilevered from said extruding means and adapted to extend through said bore in the downstream direction of the extruded conduit, said tube having a downstream free end; and
   means for inducing a magnetic flux in the cable insertion tube such that the free end of the tube comprises a magnetic pole having a given polarity; and
   means for generating a magnetic field in the vicinity of the free end of said tube to magnetically levitate the tube and prevent the free end thereof from sagging and contacting the polymeric conduit.

2. Apparatus according to claim 1, wherein said tube has an upstream free end, said magnetic inducing means comprising an electrical winding surrounding a portion of the upstream end of said tube and a first source of electric power connected to said winding for inducing a magnetic flux in the tube with the given polarity at the downstream free end and the opposite polarity at the upstream free end of the tube.

3. Apparatus according to claim 2, wherein said generating means comprises a magnet having a pole with a polarity the same as said given polarity of the downstream free end of the tube, said magnet pole being disposed adjacent the downstream end of the tube and in confronting relation therewith.

4. Apparatus according to claim 3, wherein said magnet is an electromagnet.

5. Apparatus according to claim 3, wherein said magnet comprises an annular magnet structure arranged to surround the conduit and the insertion tube at the downstream free end of the latter.

6. Apparatus according to claim 5, wherein said cable insertion tube is substantially cylindrical along the downstream extent thereof, said magnet structure having a central opening adapted to receive the downstream free end of said cable insertion tube, said magnet structure having an inner circumferential face comprising the pole with a polarity the same as said given polarity of the downstream free end of the tube.

7. Apparatus according to claim 4, further comprising means for selectively energizing the electromagnet with a second source of electric power for generating said polarity at the pole thereof.

8. Apparatus according to claim 2, wherein said upstream free end of the tube extends upstream from the extrusion means and including means for paying out the cable into the upstream free end of the tube.

9. Apparatus for positioning a cable in a bore of an extruded polymeric conduit, comprising:
   means for extruding the conduit;
   a ferromagnetic cable insertion tube cantilevered from said extruding means and adapted to extend upstream of said extrusion means and downstream of said extrusion means through said bore of the extruded conduit, said cable insertion tube having a first free end at the downstream end thereof and a second free end at the upstream end thereof;
   an electrical winding surrounding the tube adjacent the second free end thereof;
   a d.c. power source connected to said winding for generating a magnetic flux in said tube with a first magnetic pole at the first free end with a given polarity and a second magnetic pole at the second free end with an opposite polarity to said given polarity; and
   magnet means having a magnetic pole with a polarity the same as said given polarity and supported in confronting relationship with said first free end in such position for magnetically levitating the tube and preventing the free end thereof from sagging into contact with the polymeric conduit.

10. Apparatus according to claim 9, wherein said magnet is an electromagnet and means operatively connected to said electromagnet for controlling the strength of the magnetic field of said electromagnet.

11. Apparatus according to claim 9, wherein said magnet means comprises a plurality of magnets arranged in an annular structure about the first free end of the tube.

12. Apparatus according to claim 9, including a plurality of cooling tanks arranged downstream of said extruding means, said tube extending through at least some of said cooling tanks, said magnet means being positioned in one of said cooling tanks adjacent the first free end of the tube.

* * * * *